United States Patent
Egger et al.

(10) Patent No.: US 10,022,018 B2
(45) Date of Patent: Jul. 17, 2018

(54) DEVICE FOR USE IN A BLENDER

(71) Applicant: KONINKLIJKE PHILIPS N.V., Eindhoven (NL)

(72) Inventors: Christian Egger, Eindhoven (NL); Heimo Obersteiner, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 867 days.

(21) Appl. No.: 14/377,307

(22) PCT Filed: Feb. 4, 2013

(86) PCT No.: PCT/IB2013/050931
§ 371 (c)(1),
(2) Date: Aug. 7, 2014

(87) PCT Pub. No.: WO2013/118041
PCT Pub. Date: Aug. 15, 2013

(65) Prior Publication Data
US 2016/0015216 A1    Jan. 21, 2016

Related U.S. Application Data

(60) Provisional application No. 61/596,756, filed on Feb. 9, 2012.

(30) Foreign Application Priority Data

Feb. 9, 2012 (EP) .................................... 12154594

(51) Int. Cl.
*A47J 43/044* (2006.01)
*A47J 43/07* (2006.01)

(52) U.S. Cl.
CPC ......... *A47J 43/044* (2013.01); *A47J 43/0711* (2013.01); *A47J 2043/04427* (2013.01)

(58) Field of Classification Search
CPC . A47J 43/0705; A47J 43/0727; A47J 43/0711
See application file for complete search history.

(56) References Cited

U.S. PATENT DOCUMENTS

D348,587 S     7/1994 Saltet
5,639,034 A    6/1997 Rebordosa
(Continued)

FOREIGN PATENT DOCUMENTS

WO        9948411 A1      9/1999
WO        2011113082 A1   9/2011

*Primary Examiner* — Tony G Soohoo
*Assistant Examiner* — Elizabeth Insler (57) ABSTRACT

A device for use in a blender comprises a rotatably arranged tool (10) for moving through food to be processed by means of the blender, and a tool cage (20) for partially covering the tool (10). The tool cage (20) is shaped like a hollow cylinder having a longitudinal axis and an inner surface (24) with exclusively non-convex areas, wherein a cross-sectional shape of the tool cage (20) deviates from a circular shape and has at least one protruding area which is outside of an imaginary circle being centrally positioned about the longitudinal axis and touching the inner surface (24) while having a minimum radius. The inner surface (24) of the tool cage (20) may have a triangular shape or a square shape about the longitudinal axis. A dimensionless characteristic value and a range for the value are defined for predicting quality of performance of the device.

15 Claims, 4 Drawing Sheets

(56) References Cited

U.S. PATENT DOCUMENTS

| | | | |
|---|---|---|---|
| 6,398,403 B1 | 6/2002 | Rebordosa | |
| D623,485 S * | 9/2010 | Silvers | D7/683 |
| D663,573 S * | 7/2012 | Nordwall | D7/376 |
| 8,550,695 B2 * | 10/2013 | Conti | A47J 43/0727 366/205 |
| 2002/0034121 A1 * | 3/2002 | Rebordosa | A47J 43/0711 366/129 |
| 2004/0159624 A1 * | 8/2004 | Miller | A47J 43/046 215/222 |
| 2013/0003489 A1 * | 1/2013 | Hoare | A47J 43/0705 366/129 |

* cited by examiner

DEVICE FOR USE IN A BLENDER

This application is the U.S. National Phase application under 35 U.S.C. § 371 of International Application No. PCT/IB2013/050931, filed on Feb. 4, 2013, which claims the benefit of U.S. Provisional Application No. 61/596,756 filed on Feb. 9, 2012 and European Application 12154594.1 filed Feb. 9, 2012. These applications are hereby incorporated by reference herein.

FIELD OF THE INVENTION

The present invention relates to a device for use in a blender, comprising a rotatably arranged tool for moving through food to be processed by means of the blender, and a tool cage for partially covering the tool, wherein the tool cage is shaped like a hollow cylinder having a longitudinal axis and an inner surface which exclusively comprises areas with a non-convex general shape, wherein a cross-sectional shape of the tool cage, i.e. a shape of an imaginary section perpendicular to the longitudinal axis, deviates from a circular shape and has at least one protruding area which is outside of an imaginary circle being positioned inside the tool cage and touching the inner surface while having a minimum radius.

The present invention also relates to a blender, comprising a device as mentioned, and means for driving the tool which is part of the device.

BACKGROUND OF THE INVENTION

In general, a blender is a household appliance which is adapted to be used for processing food, particularly mixing, comminuting, and/or aerating food. To this end, the blender comprises one or more rotatably arranged tools such as whisks or knives for moving through the food. In one known type of blender, which is known as stick blender, a rotatably arranged knife is applied, which usually has two diametrically arranged blades in a more or less flat appearance, like a propeller. Furthermore, a stick blender has a housing for accommodating components of the blender, including means such as a motor for driving the knife, and an elongated, stick-shaped device carrying the knife at an end thereof. The housing is shaped such that it is possible for a user to take hold of the blender in a very convenient manner, and to have a firm grip on the blender during food processing actions. In use, the user inserts the stick-shaped device in a quantity of food, with the knife down, wherein the food is processed as the knife rotates. The user may move the blender during a food processing action, so as to continually change the location of the rotating knife in the food.

In order to avoid injuries of the user and/or damage to an inner surface of a container in which food to be processed is present, it is desirable to have the knife covered as much as possible, however, without deteriorating the functionality of the knife. To this end, a suitable cover is used, which is referred to as tool cage, and which has an opening for allowing the knife to reach the food, but which prevents a user from freely touching the knife. Furthermore, in a more general sense, the use of a tool cage greatly improves the effectiveness of the knife and the performance of the blender. A standard orientation of a stick blender is a vertical orientation with the knife at a downside, and in such an orientation, the tool cage is at a downside of the blender as well, and serves for preventing a user from touching the knife from the side. Normally, the tool cage is shaped like a tapered, hollow cylinder having an open end, like a cup, a bell, a bowl, a tulip, an umbrella, or the like. The tool cage may be removably arranged for cleaning purposes, for example.

A tool cage as mentioned, suitable for use in a hand-held blender or mixer, is known from WO 99/48411. It is noted that in this text, the words "blender" and "mixer" are regarded as equivalents, and that only the word "blender" is used. An inner surface of the tool cage defines a space which is accessible from below via an opening through which food is supplied and discharged during a food processing action. The inner surface has on its circumference individual outwardly extending wall sections for the formation of clearance spaces, wherein the wall sections serve primarily for the diversion, comminution, and/or enhanced mixing of food, while the clearance spaces are used for receiving and discharging the food. Hence, in this design of a tool cage, a cross-section of the tool cage is shaped like an undulating ring, with alternating concave and convex portions.

In U.S. Pat. No. 5,639,034, another tool cage is disclosed, which includes an inner surface having a cross-section which takes the form of a substantially regular polygon with at least five and preferably fifteen sides. On the basis of this particular shape of the inner surface of the tool cage, food materials are comminuted in the tool cage particularly rapidly. After the food impinges against the inner surface, the polygonal profile causes the food to be deflected from the inner surface and to be directed back to the area where the knife is for further comminution.

SUMMARY OF THE INVENTION

It is an object of the present invention to provide another design for a tool cage than the known designs, which, among other things, allows for effective food processing actions, provides for an improved reachability of food in corners of containers, allows for an easy manufacturing process, allows for easy cleaning, provides for improved handling by a user, and contributes to having reduced energy consumption in the blender in which it is used. The object is achieved by means of a device for use in a blender, comprising a rotatably arranged tool for moving through food to be processed by means of the blender, and a tool cage for partially covering the tool, wherein the tool cage is shaped like a hollow cylinder having a longitudinal axis and an inner surface which exclusively comprises areas with a non-convex general shape, wherein a cross-sectional shape of the tool cage deviates from a circular shape and has at least one protruding area which is outside of an imaginary circle being centrally positioned about the longitudinal axis and touching the inner surface while having a minimum radius, and wherein the device has a geometry according to the following requirement:

$$7 \leq S \leq 18,$$

in which S is a dimensionless characteristic value which is defined by the following formula:

$$S = \frac{R_{tool}^2}{(R_{max}^2 - R_{min}^2)} * N$$

in which $R_{tool}$ represents the maximum radius of the tool, $R_{max}$ represents the maximum inner radius of the tool cage, measured at a highest level of the tool, $R_{min}$ represents the minimum inner radius of the tool cage, measured at the highest level of the tool, and N represents the number of protruding areas.

According to the present invention, a device with a tool cage having an inner surface which exclusively comprises areas with a non-convex general shape is provided. Hence, the inner surface of the tool cage only has portions with a straight and/or concave general shape, on the basis of which a good cleanability of the inner surface is obtained. Also, it is achieved that a flow of food inside the tool cage can take place in a smooth and unhindered manner, due to the absence of convex portions of the inner surface in general. Furthermore, the tool cage is shaped like a hollow cylinder. In the context of the present invention, the term cylinder is not limited to the most common concept of this term, which involves a straight longitudinal axis and a circular circumference about the longitudinal axis. A notable deviation from the most common concept resides in the fact that the circumference of the tool cage is non-circular, in other words, the fact that the circumference can have any shape but a circular one. Other deviations are possible as well if so desired, as long as the geometry requirements as defined in the preceding paragraph are taken into account. In respect of the longitudinal axis, it is noted that this axis may be the same as an axis of symmetry in cases where the cylinder has a circumference which is rotation symmetrical.

Furthermore, a cross-sectional shape of the tool cage deviates from a circular shape in that this shape has at least one protruding area which is outside of an imaginary circle being centrally positioned about the longitudinal axis and touching the inner surface while having a minimum radius. The protruding area has an important function in allowing transport of food in and out of the tool cage, among other things.

Various designs of the tool cage are known in the art, including designs having an inner surface with exclusively non-convex areas, wherein a cross-sectional shape of the tool cage deviates from a circular shape and has at least one protruding area which is outside of an imaginary circle being positioned inside the tool cage and touching the inner surface while having a minimum radius. For example, such a design is known from U.S. Pat. No. 5,639,034, in view of the fact that this document discloses a tool cage having a polygonal profile with a number of sides in a range of five to fifteen, as explained in the foregoing. However, when a certain design is considered, it is not prima facie clear if that design will actually be capable of meeting requirements in respect of good performance. In other words, it is not prima facie clear if that design will contribute to a fast and effective blending process and good blending results. According to the present invention, in order to overcome this problem, a dimensionless characteristic value is introduced, and a range is determined for this value, so that it is possible to predict the effectiveness of certain designs, namely by determining if the characteristic values of the designs are inside or outside of the range. In fact, the dimensionless characteristic value can be regarded as a performance indication number.

In particular, the present invention proposes to use a dimensionless characteristic value which defines the geometry of a tool cage on the basis of a relation between a cross-sectional area which is used for blending, i.e. a cross-sectional area which is covered by the rotatably arranged tool, and a cross-sectional area of a protruding area, at the highest level of the tool, i.e. the level which is both reached by the tool inside the tool cage and the furthest remote from an open end of the tool cage, for the total number of protruding areas. As has been noted in the foregoing, this dimensionless characteristic value is defined by the following formula:

$$S = \frac{R_{tool}^2}{(R_{max}^2 - R_{min}^2)} * N$$

in which $R_{tool}$ represents the maximum radius of the tool, $R_{max}$ represents the maximum inner radius of the tool cage, measured at a highest level of the tool, $R_{min}$ represents the minimum inner radius of the tool cage, measured at the highest level of the tool, and N represents the number of protruding areas. In a practical case, the cross-sectional shape of the tool cage can have a rotational symmetry about the longitudinal axis, wherein the number of protruding areas can be easily determined, and may be the same as the number associated with the rotational symmetry.

For the purpose of applying the formula, the maximum radius of the tool is found on the basis of a largest radial dimension of the tool, i.e. a largest distance between a tip of the tool and an axis about which the tool is rotatable, measured in an imaginary plane which is perpendicular to the axis as mentioned. The maximum inner radius of the tool cage is found on the basis of the radius of the largest imaginary circle being centrally positioned about the longitudinal axis and touching the inner surface while having a maximum radius, measured in an imaginary plane which is perpendicular to the longitudinal axis, i.e. a cross-sectional plane, and which is located at the highest level of the tool. Likewise, the minimum inner radius of the tool cage is found on the basis of the radius of the smallest imaginary circle being centrally positioned about the longitudinal axis and touching the inner surface while having a minimum radius, measured in an imaginary plane which is perpendicular to the longitudinal axis, and which is located at the highest level of the tool.

In view of the fact that it is possible for every device comprising a tool and a tool cage having an inner surface with exclusively non-convex areas and at least one protruding area as defined in the foregoing to determine the values of the maximum radius of the tool, the maximum inner radius of the tool cage at the highest level of the tool, the minimum inner radius of the tool cage at the highest level of the tool, and the number of protruding areas, it is possible to determine the value of the dimensionless characteristic value. A suitable range for the dimensionless characteristic value has been found on the basis of tests which were performed in the context of the present invention, namely by checking for devices of various designs whether a good blending performance, a low suction force on the food to be processed, and a low degree of splashing were obtained, or not.

In particular, in the context of the present invention, two different devices were tested, and it was found that both devices meet the requirements as to blending performance, suction force, and splashing. A first test device is a device comprising a tool cage of which the inner surface has a triangular shape about the longitudinal axis, wherein a wall thickness of the tool cage is more or less the same for all locations on the tool cage, so that the outer surface is triangular about the longitudinal axis as well. The triangular shape is chosen such that the tool cage has a threefold rotational symmetry about the longitudinal axis. Furthermore, the corners of the triangular shape are rounded, and the sides of the triangular shape are curved outwardly and thereby shaped like a segment of a circle, as it were. The maximum radius of the tool of the first test device is 25.15 mm, the maximum inner radius of the tool cage, measured at the highest level of the tool is 28.15 mm, and the minimum inner radius of the tool cage, measured at the highest level of the tool is 26.15 mm. As a consequence, the design of the first test device involves a dimensionless characteristic value having a value of 17.5. A second test device has the same characteristics as the first test device, with the exception of the maximum inner radius of the tool cage at the highest level of the tool, which is 30.65 mm. Hence, the design of the second test device involves a dimensionless characteristic value having a value of 7.4. On the basis of the particulars and performance of the devices which were tested, it is concluded that a range from 7 to 18 in respect of the dimensionless characteristic value is a practical range for guaranteeing/predicting a fast and effective blending process and good blending results.

In respect of the dimensionless characteristic value, it is noted that this value increases when the number of protruding areas increases, assuming otherwise equal design particulars, i.e. equal values in respect of the other determining factors of the dimensionless characteristic value. For example, in the case of a device having four protruding areas instead of three, while having the same values in respect of the maximum radius of the tool, the maximum inner radius of the tool cage, and the minimum inner radius of the tool cage as the first test device, the dimensionless characteristic value is 23.3, which is outside of the range. In view thereof, it is concluded that a fast and effective blending process and good blending results cannot be guaranteed.

Furthermore, from a comparison between the first test device and the second test device, it appears that the dimensionless characteristic value decreases when the maximum inner radius of the tool cage increases, assuming otherwise equal design particulars. This also implies that, assuming a certain minimum inner radius of the tool cage, a larger difference between the maximum inner radius of the tool cage and the minimum inner radius of the tool cage involves a lower dimensionless characteristic value. In other words, assuming a certain minimum inner radius of the tool cage, there is a maximum to the maximum inner radius of the tool cage, i.e. the extent of undulation of the tool cage on the basis of the presence of the protruding areas, when it comes to guaranteeing/predicting a fast and effective blending process and good blending results.

When the design particulars of the second test device are taken as a basis, and the minimum inner radius of the tool cage is chosen such as to be 28.65 mm, the dimensionless characteristic value appears to have an increased value as well, namely 16.0. This also implies that, assuming a certain maximum radius of the tool, a larger difference between the minimum inner radius of the tool cage and the maximum radius of the tool involves a higher dimensionless characteristic value. In other words, assuming a certain maximum radius of the tool, there is a maximum to the minimum inner radius of the tool cage, i.e. the space which is available around the area covered by the tool, when it comes to guaranteeing/predicting a fast and effective blending process and good blending results.

In respect of the difference between the maximum inner radius of the tool cage and the minimum inner radius of the tool cage, it is noted that a range of 2.0 mm to 5.0 mm is a practical range, wherein a value of 3.0 mm is a preferred value. In respect of the difference between the minimum inner radius of the tool cage and the maximum radius of the tool, it is noted that a range of 1.0 mm to 5.0 mm is a practical range, wherein a value of 2.0 mm is a preferred value. In respect of the maximum radius of the tool, it is noted that a range of 20.0 mm to 30.0 mm is a practical range, wherein a value of 25.0 mm is a preferred value. A preferred value of the dimensionless characteristic value is about 17.

In a preferred embodiment of the device according to the present invention, the tool cage has one of a triangular shape about the longitudinal axis, wherein three protruding areas are constituted by the three corners of the triangular shape, and a square shape about the longitudinal axis, wherein four protruding areas are constituted by the four corners of the square shape. Naturally, in order to guarantee usefulness of the device, the other design particulars should be chosen such that a practical dimensioning of the device is obtained on the one hand and a dimensionless characteristic value which is inside the range of 7 to 18 is obtained on the other hand.

In the following, further details are given with respect to the tool cage of which the inner surface has a triangular shape about the longitudinal axis, which will hereinafter be referred to as triangular tool cage. The triangular tool cage is especially suitable to be used with a rotatably arranged knife having two diametrically arranged blades with cutting edges, i.e. a bar-shaped knife, in which case the tool cage is also referred to as bar cage. When the triangular tool cage is used as mentioned, a cage geometry which is highly efficient in respect of food processing is combined with a smallest possible cage volume, wherein sufficiently large feeding/discharging areas and food cutting areas are present near to the cutting edges of the knife. In particular, feeding/discharging can primarily take place in corner areas of the triangular shape, while cutting can primarily take place along the sides of the triangular shape. To this end, it is advantageous if the dimensions of the tool cage are adapted to the dimensions of the knife in such a way that only a small gap is present between ends of the knife and central portions of the sides of the triangular shape, i.e. the positions associated with the minimum inner radius of the tool cage. The tool cage can have smooth inner and outer surfaces, especially when a triangular shape with rounded corners is chosen, which are very easy to produce in various materials, including plastic materials or sheet materials. The design of the inner surface is an overall concave design. Preferably, the inner surface is free from undercuts/ribs in order to have optimal cleanability of the surface and to avoid hindrance of a flow of food inside the tool cage, although it is in principle possible to have such locally arranged members in/on the surface which is non-convex on a general level. All in all, an optimal flow of food to be processed can be obtained in the tool cage with a minimum of manufacturing efforts, which leads to reduction of costs.

Furthermore, the triangular shape of the inner surface of the tool cage allows for a triangular shape of an outer surface of the tool cage as well, so that corners of food containers can easily be reached. Smooth inner and outer surfaces allow for easy cleaning of the tool cage. Compared to conventional designs of a tool cage involving a circle shape, whether undulating or not, the design involving a triangular shape is extremely compact, cheap, and yet very functional and practical.

Preferably, like conventional tool cages, the triangular tool cage is shaped like a cup, a bell, a bowl, a tulip, an umbrella, or the like. In general, it is preferred for the tool cage to have a tapering shape, wherein the length of a circumference of the inner surface is different for different positions along the longitudinal axis.

In respect of the triangular shape, it is noted that this shape may be such that the tool cage has a threefold rotational symmetry about the longitudinal axis. The three sides of the triangular shape may be concavely curved, so that dimensions of a space between the sides and the tool decrease and increase gradually, as seen in a direction of rotation of the tool. The triangular inner surface may have rounded corners, so that an overall smooth appearance of the tool cage is obtained, and food can easily move in and out of the corner areas without getting stuck there.

An outer surface of the tool cage may be shaped in a similar manner as the inner surface, wherein a wall thickness of the tool cage may be more or less the same for all locations on the tool cage. Hence, the outer surface may be triangular about the longitudinal axis. As has already been mentioned in the foregoing, this offers the advantage of improved reachability of corners of food containers. Furthermore, the three sides of the triangular outer surface may have a convexly curved shape, and may have rounded corners, so that an overall smooth appearance without any sharp edge is obtained.

Many aspects as described in the foregoing are also applicable to a situation in which the inner surface of the tool cage has a square shape about the longitudinal axis. Among other things, it is advantageous if the corners of the square shape are rounded. Also, it is practical for the tool cage to have a fourfold symmetry about the longitudinal axis. When the outer surface of the tool cage has a square shape about the longitudinal axis as well, it is advantageous for the corners of the square shape to be rounded, and for the sides of the square shape to be convexly curved.

Like in conventional situations, it is possible for a brim of the tool cage, which is present at an open end of the tool cage, to have an undulating configuration. In such a case, when the tool cage is put down on a surface such as a bottom of a food container, food can pass in and out of an inside space of the tool cage at the locations where recessed brim portions are present, while the tool cage contacts the surface through projecting brim portions. Furthermore, it is preferred if the longitudinal axis of the tool cage coincides with an axis about which the tool is rotatable, so that a balanced and smooth blending process can be ensured.

In order to have improved cleanability of the tool cage and a good performance of the combination of the tool and the tool cage, a closing plate can be used for closing off a portion of the tool cage which is present behind the tool. Thus, such a closing plate is intended to be arranged inside the tool cage, at a position behind the tool, preferably a position right behind the tool.

The tool may be a knife comprising at least one blade, and an orientation of the blade may deviate to a relatively small extent from an orientation at right angles with an axis about which the knife is rotatable. In this way, which is known per se, it is achieved that during rotation, the knife repetitively passes several sections of the tool cage having different dimensions, assuming a tapering shape of the tool cage. Having variations of dimensions of the space between ends of the knife and the inner surface of the tool cage is advantageous in view of processes such as allowing food to enter, cutting through the food, drawing in air to the food, and discharging the food.

As has already been mentioned in the foregoing, the present invention relates to a device for use in a blender, wherein a tool cage which is part of the device is designed according to specific requirements. In particular, the requirements relate to the cross-sectional shape of the tool cage, and dimensions of the tool cage and a tool which is part of the device as well, wherein a dimensionless characteristic value and a range of that value are defined. Furthermore, the present invention relates to a blender comprising the device and means for driving the tool. The device normally has an elongated shape when the blender is a stick blender. The device may be detachable from other components of the blender, particularly a housing which is used for allowing a user to take hold of the blender, and which accommodates means such as a motor for driving the tool, but that does not alter the fact that it is also possible for the device to be an integral part of a blender.

The above-described and other aspects of the present invention will be apparent from and elucidated with reference to the following detailed description of two embodiments of a stick-shaped device for use in a blender, carrying a rotatably arranged knife at an end thereof, and comprising a tool cage for partially covering the knife and delimiting a working space of the knife in order to realize both effective flows of food to be processed and an effective impact of the knife on the food.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
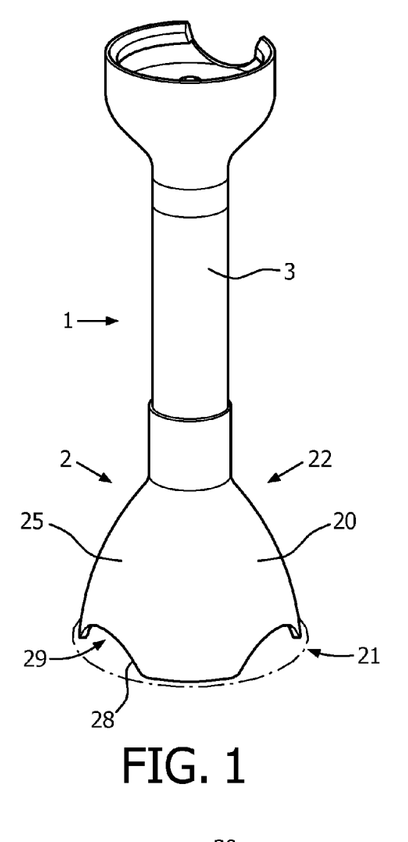
FIGS. 1 and 2 diagrammatically show perspective views of a first embodiment of a stick-shaped device for use in a blender, carrying a rotatably arranged knife at an end thereof, and comprising a tool cage for partially covering the knife.
Figure 2:
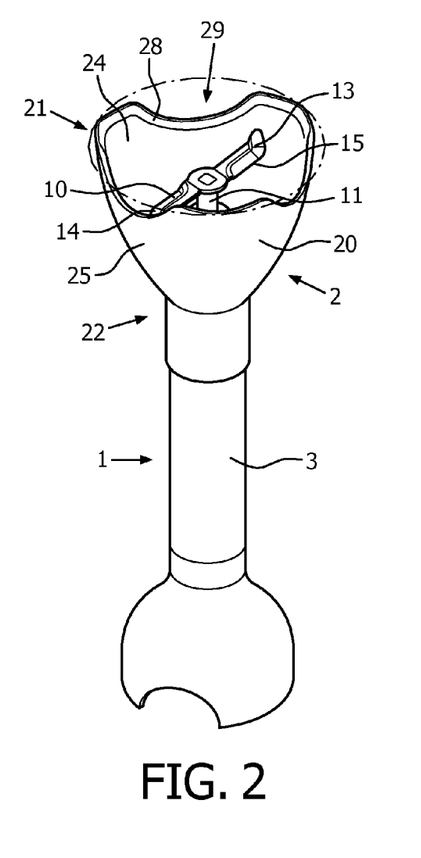

FIGS. 1 and 2 show a first embodiment of a stick-shaped device 1 for use in a blender, carrying a rotatably arranged knife 10 at an end 2 thereof, and comprising a tool cage 20 for partially covering the knife 10. For sake of completeness, it is noted that a complete blender is not shown in the figures, as the present invention particularly focuses on the device 1 comprising the knife 10 and the tool cage 20.

Figure 5:
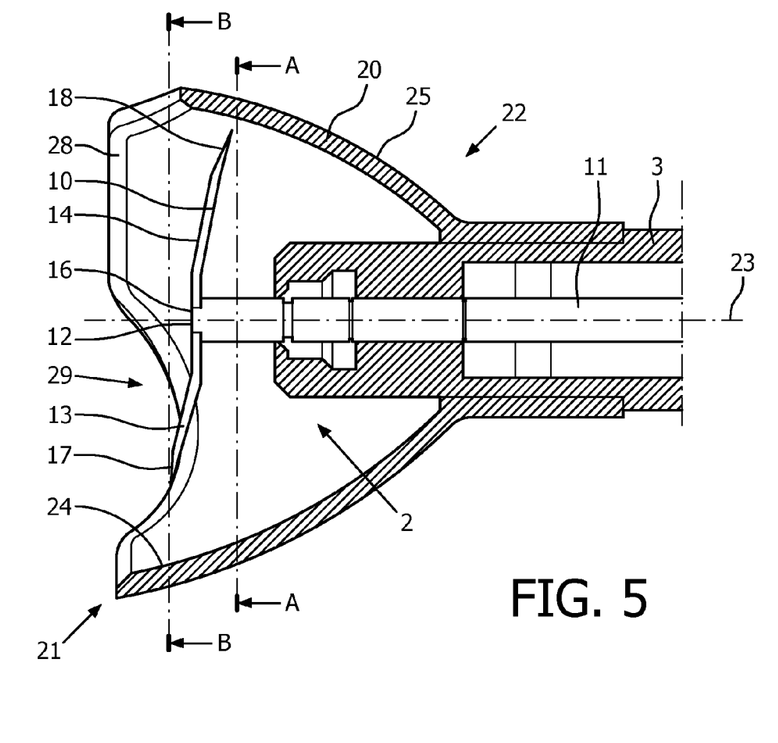
FIG. 5 diagrammatically shows a longitudinal section of an end portion of the stick-shaped device.

The stick-shaped device 1 can be made of stainless steel, for example, or plastic, as known per se. The device 1 accommodates an elongated shaft 11 for supporting and rotating the knife 10, as can be seen in FIG. 5. The knife 10 is arranged at one end 12 of the shaft 11, whereas another end (not shown) of the shaft 11 is adapted to be connected to driving means such as a motor (not shown) of the blender.

The knife 10 is usually made of stainless steel, and, in the shown example, has two diametrically arranged blades 13, 14 in a more or less flat appearance, wherein each of the blades 13, 14 has a cutting edge 15 extending along a substantial portion of a length of the blades 13, 14. For sake of completeness, it is noted that in the context of the present invention, the number of blades 13, 14 of the knife 10 does not necessarily need to be two, but may also be three, for example. In any case, when the knife 10 is rotated, a local flow of food is realized, wherein the cutting edges 15 of the blades 13, 14 of the knife 10 move the food and cut through the food.

It is noted that an operational orientation of the stick-shaped device 1 is an orientation in which the knife 10 is at a downside, as shown in FIG. 1. In this text, terms such as "bottom" and "top" are related to this orientation. During use for performing a food processing action, the stick-shaped device 1 is held in a quantity of food with the tool cage 20 down, and with the knife 10 performing a rotating movement.

Figure 3:
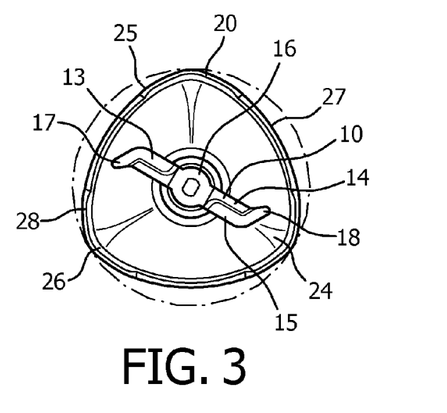
FIG. 3 diagrammatically shows a bottom view of the tool cage and the knife.
Figure 4:
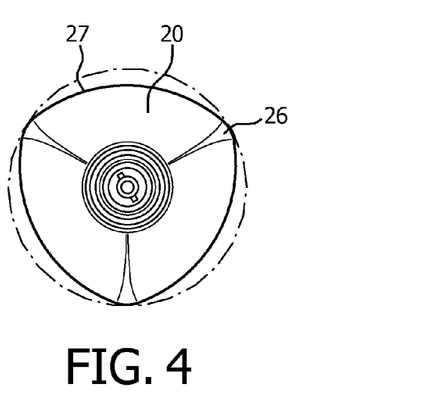
FIG. 4 diagrammatically shows a top view of the tool cage.

FIG. 3 shows a bottom view of the tool cage 20 and the knife 10, and FIG. 4 shows a top view of the tool cage 20. In FIGS. 1 and 2, it can be seen that the tool cage 20 is shaped like a hollow cylinder, which has an open end 21 for allowing access to the knife 10. At another end 22, the tool cage 20 is also open, so that a portion of a support stick 3 of the stick-shaped device 1 can extend into the tool cage 20 from the side of that other end 22, as can be seen in FIG. 5. In the following, for sake of clarity, the first end 21 of the tool cage 20 will be referred to as bottom end 21, and the second end 22 of the tool cage 20 will be referred to as top end 22. A longitudinal axis of the tool cage 20 is depicted in FIG. 5 by means of a dash-and-dot line, and is indicated by means of reference numeral 23. The support stick 3 and the tool cage 20 may be produced as two individual pieces which can be interconnected, but it is also possible to produce the support stick 3 and the tool cage 20 as a single combined piece.

Particularly, the tool cage 20 has a tapering shape, wherein dimensions of a cross-sectional area of the tool cage 20 are the largest at the bottom end 21, and wherein dimensions of a cross-sectional area of the tool cage 20 are the smallest at the top end 22. Another notable feature of the tool cage 20 is that the tool cage 20 has a triangular shape when being viewed from the direction in which the longitudinal axis 23 extends, as can be seen in FIGS. 3 and 4. In the shown example, both an inner surface 24 of the tool cage 20 and an outer surface 25 of the tool cage 20 are triangular about the longitudinal axis 23. In FIGS. 2, 3, and 4, an imaginary circle is depicted by means of a dash-and-dot line, in order to clearly illustrate how the shape of the surfaces 24, 25 is non-circular, particularly triangular. On the basis of the triangular shape, the tool cage 20 has a threefold rotational symmetry about the longitudinal axis 23. In the shown example, the tool cage 20 has an overall smooth appearance on the basis of the fact that corners 26 of the triangular shape are chosen such as to be rounded, and sides 27 of the triangular shape are chosen such as to be curved, wherein the inner surface 24 is concave, and the outer surface 25 is convex.

On the basis of the triangular shape and the overall smooth appearance as mentioned, it is very well possible to reach corners of food containers, to avoid damage to an inner surface of such containers, and to clean the tool cage 20, to mention a few advantages of the design of the tool cage 20 according to the present invention. Furthermore, at the corners 26 of the triangular shape, food to be processed can be received and discharged, whereas the food can be compacted near the sides 27 of the triangular shape, so that effective flows of food can be obtained during operation of the blender and immersion of at least the area of the blender where the knife 10 is located in an amount of food, and effective food processing actions can be realized. In view of the fact that the inner surface 24 of the tool cage 20 has an overall concave appearance, and does not comprise any convex portions, consumption of power needed for driving the knife 10 is reduced to a minimum.

In FIGS. 1, 2 and 5, it can be seen that it is possible to have an undulating shape for a brim 28 of the tool cage 20, i.e. an outer edge of the tool cage 20 at the bottom end 21 thereof. In this way, it is achieved that a number of openings are present in the tool cage 20 when the tool cage 20 is held against a surface such as a bottom of a food container, which openings allow food to flow in and out of the tool cage 20, and which facilitate movements of the tool cage 20 through the food, especially sideward movements. It is understood that the openings as mentioned are present at the positions of recessed portions 29 of the undulating shape.

Figure 6:
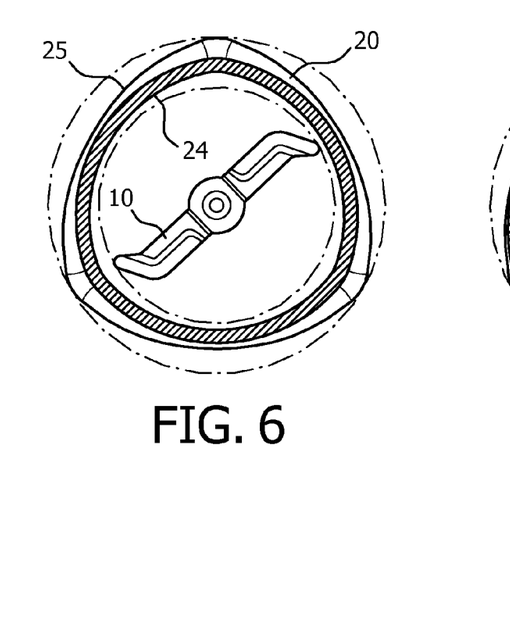
FIG. 6 diagrammatically shows a top view of a cross-section indicated as A-A in FIG. 5.
Figure 7:
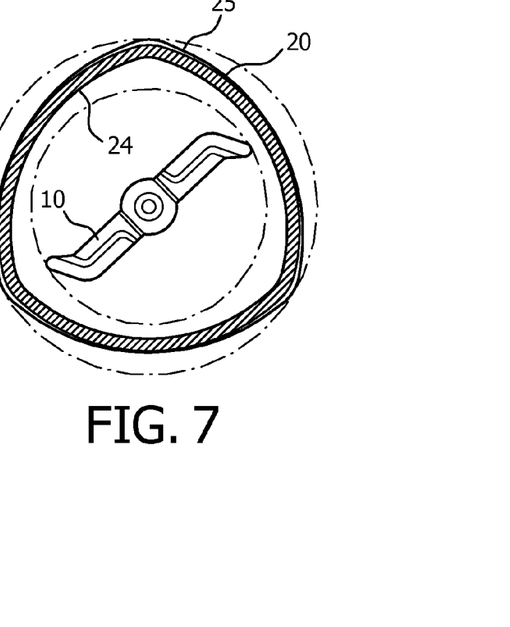
FIG. 7 diagrammatically shows a top view of a cross-section indicated as B-B in FIG. 5, wherein the knife is shown for better visualization.

FIG. 5 clearly illustrates a preferred shape of the knife 10 and a preferred positioning of the knife 10 on the support stick 3 and inside the tool cage 20. In the first place, it is noted that the longitudinal axis 23 of the tool cage 20 coincides with a longitudinal axis of the shaft 11 for rotating the knife 10, i.e. an axis about which the knife 10 is rotatable. In the second place, it is noted that the blades 13, 14 of the knife 10 have an orientation which deviates to some extent from an orientation at right angles with the axis 23. Consequently, the blades 13, 14 are not exactly horizontal in the operational orientation of the stick-shaped device 1. Instead, one blade 13 is inclined somewhat upward, and another blade 14 is inclined somewhat downward with respect to a central portion 16 of the knife 10 where the knife 10 is attached to the shaft 11. In this way, it is achieved that tip portions 17, 18 of the blades 13, 14 rotate in different planes. A cross-sectional area of the tool cage 20 at a plane more to the bottom side is larger than a cross-sectional area of the tool cage 20 at a plane more to the top side, due to the tapering shape of the tool cage 20. This is clearly illustrated by means of FIGS. 6 and 7, wherein FIG. 6 shows the relatively small cross-sectional area, and wherein FIG. 7 shows the relatively large cross-sectional area. In comparison with a horizontal orientation, a larger area inside the tool cage 20 is involved in food cutting processes to be performed by means of the knife 10 when the tip portions 17, 18 of the blades 13, 14 are rotated at different levels inside the tool cage 20, whereby a more effective food cutting process can be realized. For sake of completeness, it is noted that the level of the relatively small cross-sectional area is the highest level of the knife 10, i.e. the level where the tip portion 18 which is more to the top side of the tool cage 20 is located, and the level of the relatively large cross-sectional area is the lowest level of the knife 10, i.e. the level where the tip portion 17 which is more to the bottom side of the tool cage 20 is located.

Figure 8:
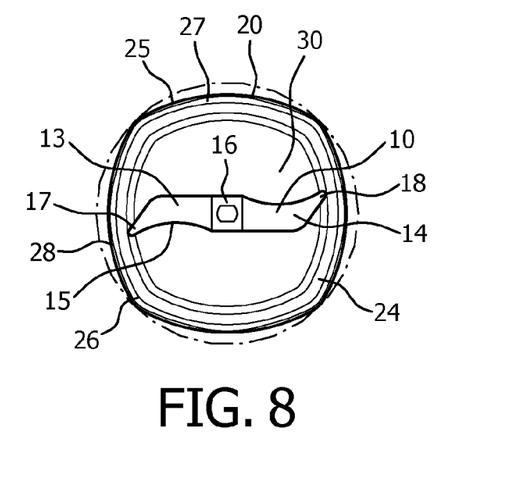
FIG. 8 shows a bottom view of the tool cage and the knife of a second embodiment of a stick-shaped device for use in a blender.
Figure 9:
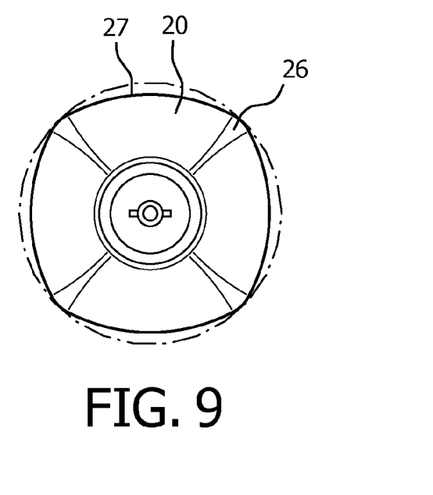
FIG. 9 diagrammatically shows a top view of the tool cage.
Figure 10:
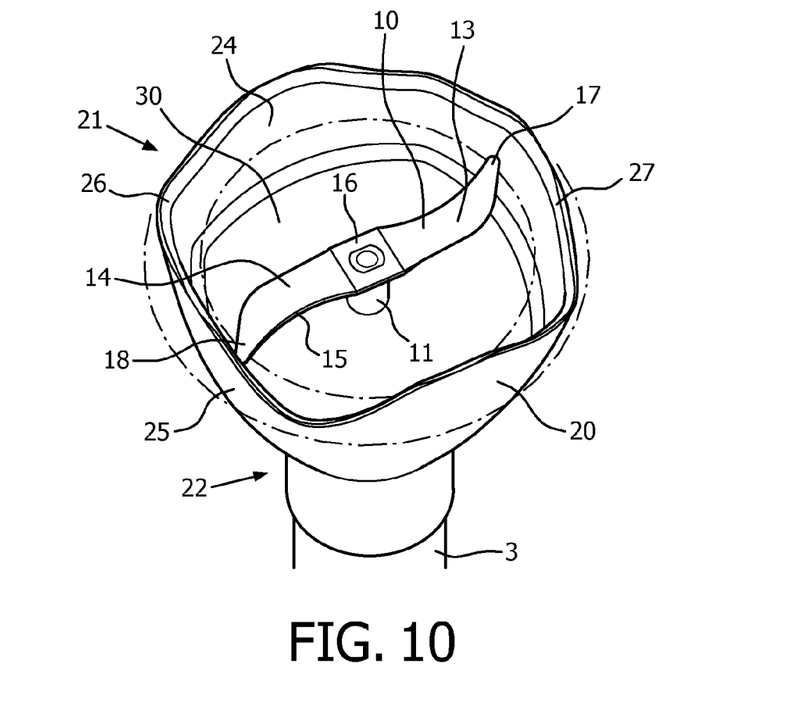
FIG. 10 diagrammatically shows a perspective view of an end portion of the stick-shaped device.

FIGS. 8-10 relate to a second embodiment of the stick-shaped device 1 according to the present invention. A difference between the first embodiment as described in the foregoing on the basis of FIGS. 1-7 and the second embodiment resides in the shape of the tool cage 20. In particular, in the second embodiment, the tool cage 20 has a square shape when being viewed from the direction in which the longitudinal axis 23 extends. In the shown example, both an inner surface 24 of the tool cage 20 and an outer surface 25 of the tool cage 20 are square about the longitudinal axis 23. In FIGS. 8-10, an imaginary circle is depicted by means of a dash-and-dot line, in order to clearly illustrate how the shape of the surfaces 24, 25 is non-circular, particularly square. On the basis of the square shape, the tool cage 20 has a fourfold rotational symmetry about the longitudinal axis 23. In the shown example, the tool cage 20 has an overall smooth appearance on the basis of the fact that corners 26 of the square shape are chosen such as to be rounded, and sides 27 of the square shape are chosen such as to be curved, wherein the inner surface 24 is concave, and the outer surface 25 is convex.

In FIGS. 8 and 10, an option of having a closing plate 30 inside the tool cage 20, at a position behind the knife 10, preferably a position right behind the knife 10, is illustrated. Due to the presence of the closing plate 30, a top portion of the tool cage 20 is closed, whereby it is prevented that food to be processed can flow to that top portion. In this way, cleanability of the tool cage 20 is enhanced, as it is not possible for food to accumulate in the top portion. Furthermore, on the basis of the presence of the closing plate 30, a working space of the tool cage 20 is decreased, and the performance of the combination of the knife 10 and the tool cage 20 is improved. Preferably, the closing plate 30 has a planar appearance, as is the case in the shown example.

According to the present invention, a dimensionless characteristic value is determined in respect of the stick-shaped device 1, particularly the combination of the knife 10 and the tool cage 20, and this value is compared with a predetermined range of values in order to find out whether an effective performance and good blending results can be expected.

The dimensionless characteristic value is found by using the following formula:

$$S = \frac{R_{tool}^2}{(R_{max}^2 - R_{min}^2)} * N$$

in which $R_{tool}$ represents the maximum radius of the tool/knife 10, $R_{max}$ represents the maximum inner radius of the tool cage 20, measured at the highest level of the tool/knife 10, $R_{min}$ represents the minimum inner radius of the tool cage 20, measured at the highest level of the tool/knife 10, and N represents the number of protruding areas, i.e. the number of areas which are outside of an imaginary circle being centrally positioned about the longitudinal axis 23 and touching the inner surface 24 of the tool cage 20 while having a minimum radius.

The range of the dimensionless characteristic value is a range from 7 to 18. When the geometry of the device 1 has a characteristic value which is within this range, effective functioning of the device 1 can be guaranteed. A possibility for predicting whether a combination of a rotatably arranged tool/knife 10 and a tool cage 20 for partially covering the tool/knife 10 can be expected to realize good blending results in an acceptable period of time is not known from the art. According to the present invention, the dimensionless characteristic value as defined in the foregoing can be determined and then compared to the range as mentioned. Only if the dimensionless characteristic value is inside the range, it is concluded with certainty that proper functioning of the device 1 can be expected.

Figure 11:
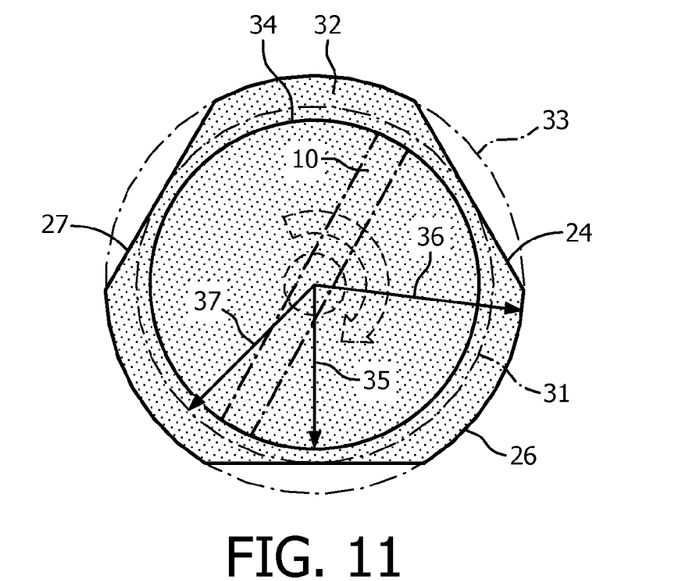
FIG. 11 serves to illustrate a number of determining factors of a dimensionless characteristic value of the design of the first embodiment of the stick-shaped device.
Figure 12:
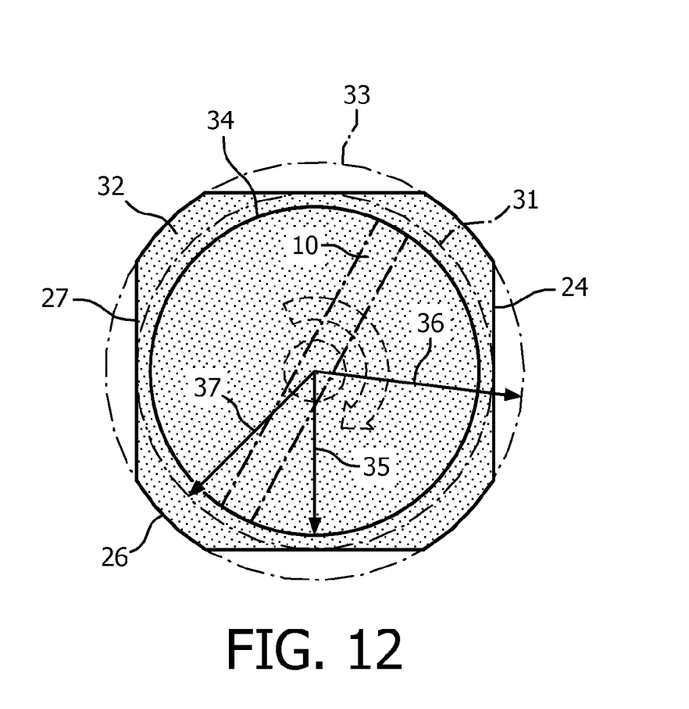
FIG. 12 serves to illustrate a number of determining factors of a dimensionless characteristic value of the design of the second embodiment of the stick-shaped device.

FIGS. 11 and 12 serve to illustrate the various factors which are used for determining the dimensionless characteristic value, for the triangular shape of the inner surface 24 of the tool cage 20 about the longitudinal axis 23, and the square shape of the inner surface 24 of the tool cage 20 about the longitudinal axis 23, respectively. In the figures, the shape of the inner surface 24, which is a (rotation) symmetrical shape in this case, with rounded corners 26 and straight sides 27, is shown. An imaginary circle being centrally positioned about the longitudinal axis 23 and touching the inner surface 24 while having a minimum radius is indicated by reference numeral 31. Protruding areas which are outside of the circle as mentioned, and which can also be denoted as lobes, for example, are indicated by reference numeral 32. An imaginary circle being centrally positioned about the longitudinal axis 23 and touching the inner surface 24 while having a maximum radius is indicated by reference numeral 33. An imaginary circle delimiting an area which is covered by the tool/knife 10 is indicated by reference numeral 34. A maximum radius of the tool/knife 10, which is the radius of the area as mentioned, is indicated by an arrow 35. A maximum inner radius of the tool cage 20, which is the radius of the imaginary circle 33 being centrally positioned about the longitudinal axis 23 and touching the inner surface 24 while having a maximum radius, is indicated by an arrow 36. A minimum inner radius of the tool cage 20, which is the radius of the imaginary circle 31 being centrally positioned about the longitudinal axis 23 and touching the inner surface 24 while having a minimum radius, is indicated by an arrow 37.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The present invention can be summarized as follows. A device 1 for use in a blender comprises a rotatably arranged tool 10 for moving through food to be processed by means of the blender, and a tool cage 20 for partially covering the tool 10. The tool cage 20 is shaped like a hollow cylinder having a longitudinal axis 23 and an inner surface 24 with exclusively non-convex areas, wherein a cross-sectional shape of the tool cage 20 deviates from a circular shape and has at least one protruding area 32. The tool can be a knife 10 comprising at least one blade 13, 14. The inner surface 24 of the tool cage 20 can have a triangular shape or a square shape about the longitudinal axis 23, so that sufficiently large areas for receiving and discharging food to be processed are realized at the inside of the tool cage 20, which are near to the tool 10, and suitable areas for allowing the tool 10 to act on the food are realized as well. The triangular shape or the square shape can be such that the inner surface 24 of the tool cage 20 only has smooth concave portions, wherein it is possible to let food processing actions take place at a minimum level of power consumption.

An outer surface 25 of the tool cage 20 can have a triangular shape or a square shape about the longitudinal axis 23 as well. In general, with the triangular shape or the square shape, it is possible to have an overall smooth appearance of the tool cage 20, as a result of which a manufacturing process of the tool cage 20 may be easy and therefore cheap, and it may be easy to clean the tool cage 20. Furthermore, with the triangular shape or the square shape at the outside, it is easy to reach food located in corners of a food container or the like.

A dimensionless characteristic value and a range for the value are defined for predicting quality of performance of the device 1 according to the present invention. In particular, the device 1 has a geometry according to the following requirement:

$$7 \leq S \leq 18,$$

in which S is a dimensionless characteristic value which is defined by the following formula:

$$S = \frac{R_{tool}^2}{(R_{max}^2 - R_{min}^2)} * N$$

in which $R_{tool}$ represents the maximum radius of the tool 10, $R_{max}$ represents the maximum inner radius of the tool cage 20, measured at the highest level of the tool 10, $R_{min}$ represents the minimum inner radius of the tool cage 20, measured at the highest level of the tool 10, and N represents the number of protruding areas 32. With this geometry, it is guaranteed that a fast and effective blending process and good blending results are obtained when the device 1 is used as part of a blender for processing food.

The invention claimed is:

1. A device for use in a stick blender, comprising:
a rotatably arranged tool for moving through food to be processed by means of the blender; and
a tool cage for partially covering the tool, wherein the tool cage is shaped like a hollow cylinder having (i) a longitudinal axis and (ii) an inner surface, wherein the inner surface exclusively comprises a non-convex general shape, wherein the inner surface further comprises a cross-sectional shape that deviates from a circular shape and has at least three protruding areas, wherein each of the at least three protruding areas comprises an area outside of an area of an imaginary circle that is (i) centrally positioned about the longitudinal axis and (ii) having a minimum radius for touching the inner surface in at least three places, and wherein a composite geometry of the rotatably arranged tool and the tool cage is characterized by a dimensionless characteristic value, S, in a range of:

$$7 \leq S \leq 18,$$

wherein the dimensionless characteristic value S is defined by a formula:

$$S = \frac{R_{tool}^2}{(R_{max}^2 - R_{min}^2)} * N,$$

wherein $R_{tool}$ represents a maximum radius of the rotatably arranged tool, $R_{max}$ represents a maximum inner radius of the inner surface about the longitudinal axis, measured at a highest level of the rotatably arranged tool within the tool cage, $R_{min}$ represents a minimum inner radius of the inner surface about the longitudinal axis, measured at the highest level of the rotatably arranged tool within the tool cage, and N represents a number of protruding areas of the at least three protruding areas.

2. The device according to claim 1, wherein the inner surface of the tool cage has one of
a triangular shape about the longitudinal axis, wherein three protruding areas are constituted by three corners of the triangular shape, and
a square shape about the longitudinal axis, wherein four protruding areas are constituted by four corners of the square shape.

3. The device according to claim 2, wherein the corners of the shape of the inner surface of the tool cage are rounded.

4. The device according to claim 2, wherein the inner surface of the tool cage has a triangular shape about the longitudinal axis, and wherein the tool cage has a threefold rotational symmetry about the longitudinal axis.

5. The device according to claim 2, wherein the inner surface of the tool cage has a square shape about the longitudinal axis, and wherein the tool cage has a fourfold rotational symmetry about the longitudinal axis.

6. The device according to claim 1, wherein the tool cage has a tapering shape along the longitudinal axis.

7. The device according to claim 1, wherein both the inner surface and the outer surface of the tool cage have one of
a triangular shape about the longitudinal axis, wherein three protruding areas are constituted by three corners of the triangular shape, and
a square shape about the longitudinal axis, wherein four protruding areas are constituted by four corners of the square shape.

8. The device according to claim 7, wherein sides of the inner surface of the tool cage, that correspond to portions extending between inside corners of a shape of the inner surface of the tool cage, comprise straight sides, wherein the inside corners comprise rounded corners with abrupt transitions at each of a respective intersection between an inside corner and an adjacent straight side of the inner surface, wherein sides of the outer surface of the tool cage, that correspond to portions extending between corners of the outer surface of the tool cage, have a convexly curved shape, and wherein the corners of the shape of the outer surface of the tool cage comprise rounded corners.

9. The device according to claim 7, wherein the corners of the shape of the outer surface of the tool cage are rounded.

10. The device according to claim 1, wherein a difference between the maximum inner radius of the tool cage and the minimum inner radius of the tool cage is in a range of 2.0 mm to 5.0 mm.

11. The device according to claim 1, wherein a difference between the minimum inner radius of the tool cage and the maximum radius of the rotatably arranged tool is in a range of 1.0 mm to 5.0 mm.

12. The device according to claim 1, wherein the maximum radius of the rotatably arranged tool is in a range of 20.0 mm to 30.0 mm.

13. The device according to claim 1, further comprising a closing plate arranged inside the tool cage, at a position behind the rotatably arranged tool, for closing off a portion of the tool cage.

14. The device according to claim 1, wherein the rotatably arranged tool is a knife, wherein the knife comprises at least one blade, and wherein an orientation of the at least one blade deviates to a relatively small extent from an orientation at right angles with an axis about which the knife is rotatable.

15. A stick blender comprising the device according to claim 1, and means for driving the tool which is part of the device.

* * * * *